United States Patent
Bowling et al.

(10) Patent No.: US 8,984,323 B2
(45) Date of Patent: Mar. 17, 2015

(54) SCHEDULING EVENTS IN A MICROPROCESSOR USING A PLURALITY OF DELTA TIME REGISTERS ARRANGED AS A SEQUENCE BUFFER AND INDICATING A SEQUENCE POSITION OF THE SEQUENCE BUFFER TO PROCESS AN EVENT

(75) Inventors: Stephen Bowling, Chandler, AZ (US); Igor Wojewoda, Tempe, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 667 days.

(21) Appl. No.: 13/247,489

(22) Filed: Sep. 28, 2011

(65) Prior Publication Data
US 2013/0080819 A1 Mar. 28, 2013

(51) Int. Cl.
G06F 1/04 (2006.01)
G06F 1/14 (2006.01)
G06F 1/32 (2006.01)
G06F 15/78 (2006.01)

(52) U.S. Cl.
CPC ............... *G06F 1/14* (2013.01); *G06F 1/3243* (2013.01); *G06F 1/3287* (2013.01); *G06F 15/7853* (2013.01)
USPC ........................................................ 713/502

(58) Field of Classification Search
CPC ..................... G06F 1/14; G06F 1/04
USPC ........................................................ 713/502
See application file for complete search history.

(56) References Cited

U.S. PATENT DOCUMENTS

| | | | | |
|---|---|---|---|---|
| 6,232,808 | B1* | 5/2001 | Cave | 327/176 |
| 6,314,524 | B1* | 11/2001 | Cave | 713/500 |
| 2004/0220921 | A1* | 11/2004 | Billock et al. | 707/3 |
| 2006/0005054 | A1* | 1/2006 | Fernald et al. | 713/300 |
| 2007/0198698 | A1* | 8/2007 | Boyd et al. | 709/224 |
| 2008/0080648 | A1* | 4/2008 | Leung et al. | 375/354 |
| 2008/0104433 | A1* | 5/2008 | May et al. | 713/300 |
| 2009/0013199 | A1* | 1/2009 | Leung et al. | 713/300 |
| 2010/0229011 | A1* | 9/2010 | Pedersen et al. | 713/322 |
| 2013/0073891 | A1* | 3/2013 | Boehl | 713/502 |

OTHER PUBLICATIONS

International Search Report and Written Opinion, Application No. PCT/US2012/054733, 8 pages, Jan. 7, 2013.

* cited by examiner

*Primary Examiner* — Thomas Lee
*Assistant Examiner* — Robert Cassity
(74) *Attorney, Agent, or Firm* — King & Spalding L.L.P.

(57) ABSTRACT

A microcontroller has a central processing unit (CPU), a plurality of peripherals, and a programmable scheduler unit with: —a timer being clocked by an independent clock signal; —a comparator coupled with a timer register of said timer and having an output generating an output signal; —an event register coupled with said comparator; —a delta time register; and —an arithmetic logic unit controlled by the output signal of the comparator and with first and second inputs and an output, wherein the first input is coupled with the timer register or the event register and the second input is coupled with the delta time register and the output is coupled with the event register.

32 Claims, 4 Drawing Sheets

SCHEDULING EVENTS IN A MICROPROCESSOR USING A PLURALITY OF DELTA TIME REGISTERS ARRANGED AS A SEQUENCE BUFFER AND INDICATING A SEQUENCE POSITION OF THE SEQUENCE BUFFER TO PROCESS AN EVENT

TECHNICAL FIELD

The technical field of the present application relates to microcontrollers, in particular to an event generation system within a microcontroller.

BACKGROUND

Microcontrollers usually comprise a microprocessor, memory, and a plurality of peripheral devices to form a system on a chip that can be applied in a plurality of applications. One of the most common peripheral devices are timer units which can be used to generate interrupt signals, for example to form a scheduler in a real time operating system (RTOS). However, these timers and the signals they can generate are limited in their functionality.

Hence, there exists a need for an improved microcontroller.

SUMMARY

According to an embodiment, a microcontroller may comprise a central processing unit (CPU); a plurality of peripherals; and a programmable scheduler unit comprising: —a timer being clocked by an independent clock signal; —a comparator coupled with a timer register of said timer and having an output generating an output signal; —an event register coupled with said comparator; —a delta time register; and —an arithmetic logic unit controlled by the output signal of the comparator and comprising first and second inputs and an output, wherein the first input is coupled with the timer register or the event register and the second input is coupled with the delta time register and the output is coupled with the event register.

According to a further embodiment, the microcontroller may further comprise an event logic unit receiving the output signal of the comparator and controlling said arithmetic logic unit and said event register. According to a further embodiment, the microcontroller may further comprise a plurality of delta time registers. According to a further embodiment, said plurality of delta time registers can be arranged as a sequence buffer. According to a further embodiment, the sequence buffer can be a circular sequence buffer which can be controlled to output contents of said delta time registers in a circular manner, in a single sequence, or a predetermined number of times. According to a further embodiment, the microcontroller may further comprise a data formatting unit coupled with at least one of said timer register and said delta time register, wherein said data formatting unit is operable to convert an absolute time value into a relative time value. According to a further embodiment, the microcontroller may further comprise a calibration unit coupled with a predefined number of bits of said timer register and operable to overwrite said predefined number of bits in said timer register. According to a further embodiment, said calibration unit may overwrite said timer register bits periodically. According to a further embodiment, said clock select unit can be operable to select between a plurality of clock signals generated by at least one peripheral timer unit. According to a further embodiment, the microcontroller may further comprise a clock select unit which is operable to select between internal and an external clock signals. According to a further embodiment, the event logic unit may further receive an output signal of said sequence buffer, wherein said event logic unit generates a plurality of output signals. According to a further embodiment, said output signal of said sequence buffer may indicate a sequence position. According to a further embodiment, an output signal from said event logic unit can be an interrupt signal. According to a further embodiment, an output signal from said event logic unit can be a pulse signal having a predefined pulse width. According to a further embodiment, an output signal from said event logic unit can be fed to a clock control unit to enable a predetermined clock source. According to a further embodiment, the microcontroller may further comprise an event distribution unit receiving said plurality of output signals from said event logic unit and generating output signals which are fed to at least one of said CPU and at least one peripheral device. According to a further embodiment, the microcontroller may further comprise a system power control unit coupled with said event distribution unit. According to a further embodiment, said microcontroller can be battery operated. According to a further embodiment, the microcontroller may further comprise a plurality of special function registers for programming said programmable scheduler unit. According to a further embodiment, the timer register and the event register can be configured to store a UNIX time format. According to a further embodiment, the arithmetic logic unit can be an adder.

According to another embodiments, a method of operating a microcontroller comprising a central processing unit (CPU), a plurality of peripherals; and a programmable scheduler unit; may comprise: —programming a time value into a timer register of a timer; —clocking the timer; —comparing an event register with said timer register; —wherein if said event register matches said timer register, the scheduler unit automatically generates an event and adding the time value or a new time value to said event register.

According to a further embodiment of the method, the step of programming the time value can be performed by receiving a relative time or an absolute time and formatting said time to form said time value. According to a further embodiment of the method, an event may wake the CPU from a Sleep mode. According to a further embodiment of the method, an event may wake a peripheral from a Sleep mode for a predetermined time while the CPU remains in a Sleep mode. According to a further embodiment of the method, during the predetermined time, the peripheral may generate a signal to wake said CPU. According to a further embodiment of the method, a plurality of time values can be programmed within a sequential buffer. According to a further embodiment of the method, the sequence buffer can be a circular sequence buffer. According to a further embodiment of the method, the sequential buffer can be operable to be controlled to output the time values in a circular manner, in a single sequence, or predetermined number of times. According to a further embodiment of the method, the timer and event registers may store a value in UNIX time format. According to a further embodiment of the method, the method may further comprise periodically calibrating said timer register by means of a calibration unit. According to a further embodiment of the method, clocking said timer register can be selected between internal and an external clock signals. According to a further embodiment of the method, the method may further comprise processing said event to generate a plurality of output signals. According to a further embodiment of the method, to process said event a sequence position of said sequence buffer may be taken into consideration. According to a further embodiment of the method, an output signal from said plurality of output signals can be an interrupt signal. According to a further embodiment of the method, an output signal from said plurality of output signals can be a pulse signal having a predefined pulse width. According to a further embodiment of the method, generating said event may comprise distributing a plurality of output signals to at least one of: said CPU and at least one peripheral device. According to a further embodiment of the method, at least one signal of said plurality of output signals can be fed to a system power control unit. According to a further embodiment of the method, at least one signal of said plurality of output signals can be fed to a clock control unit to enable a predetermined clock source.

Other technical advantages of the present disclosure will be readily apparent to one skilled in the art from the following figures, descriptions, and claims. Various embodiments of the present application may obtain only a subset of the advantages set forth. No one advantage is critical to the embodiments.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION

In particular, battery powered microcontroller (MCU) applications may need to minimize the time spent computing time offsets in software. AC-main line power application with a stand-by power mode may have similar requirements. Most battery operated or stand-by function applications place the MCU and optionally other components in a power down (Sleep) mode to minimize power consumption. In such a Sleep mode, the MCU must wake up at periodic intervals to perform certain tasks. These tasks might include reading a sensor, checking a communication port for activity, turning on a peripheral to prepare for a future operation, etc. These events may occur at different intervals. Conventional devices use a timer circuit that operates from its own oscillator while the device is in Sleep mode. The application software must spend time computing a time offset to schedule the next desired wake-up time. The time spent computing the time offsets adds to the time that the MCU is awake, increasing the overall power consumption and shortening the battery life.

To this end, conventional MCU's have generic timers and oscillator circuits that are designed to operate while the rest of the chip is in a powered down state. These circuits allow the MCU to maintain timekeeping functionality and periodically wake up the MCU so that it can perform software tasks. According to various embodiments, such additional power consumption can be avoided amongst other benefits.

Figure 1:
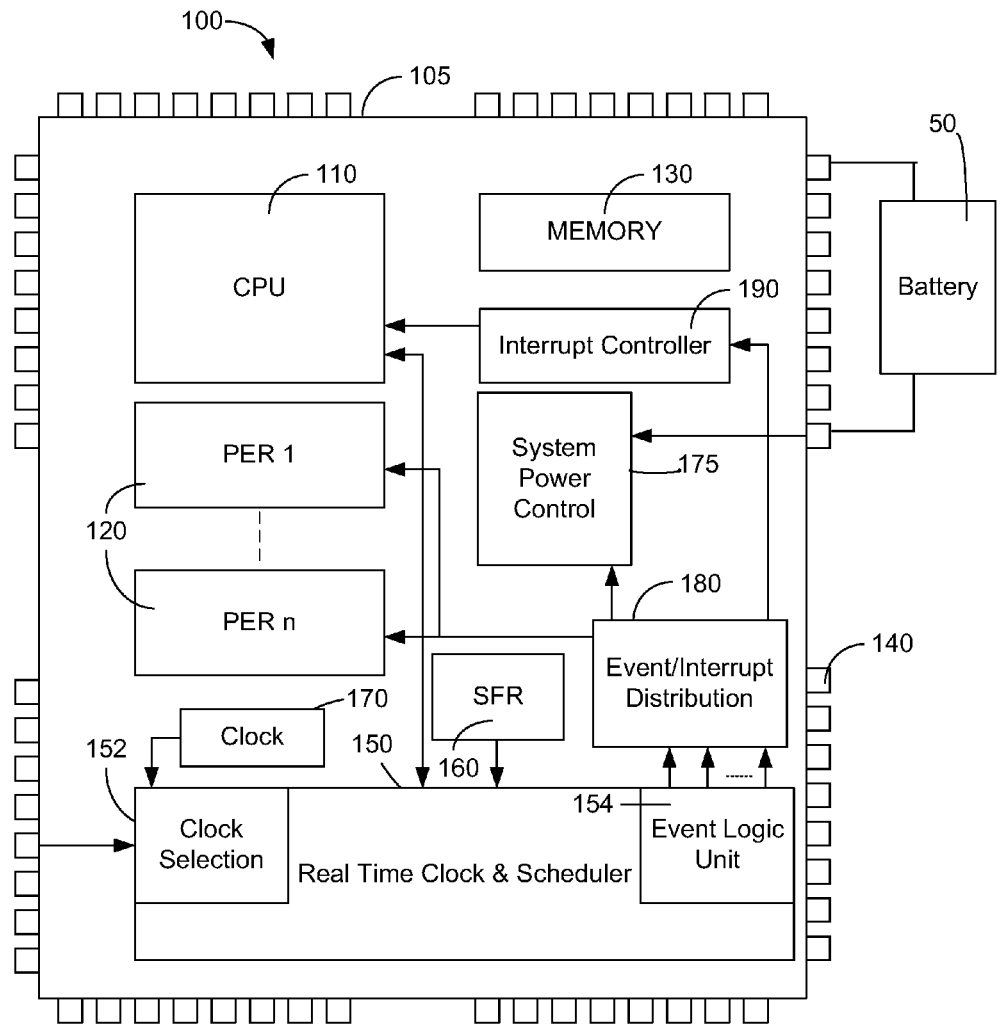
FIG. 1 is a block diagram showing a microcontroller according to an embodiment.

FIG. 1 shows a block diagram of a microcontroller 100 according to an embodiment. FIG. 1 shows only certain connections between components for sake of a better overview. Each connection can represent a single or multiple connection lines depending on the respective functionality. Some connections may be alternatives and may not be needed as will be appreciated by a person skilled in the art.

An integrated chip 100 is embedded in a housing 105 having a plurality of external pins 140. As typical for microcontrollers, the integrated chip 100 comprises a central processing unit 110, a plurality of peripheral devices 120 and memory 130.

Furthermore, according to an embodiment, the microcontroller comprises a programmable Real Time Clock & Scheduler Unit 150 (RTCS) which may have a clock selection unit 152 which can be coupled with one or more external or internal input sources. The RTCS 150 may furthermore be coupled with the CPU directly and/or via special function registers 160. To this end, the microcontroller may comprise an internal system and/or peripheral bus. The RTCS may further comprise an Event Logic Unit 154 which is coupled with an event/interrupt distributing unit 180. However, in other embodiments, the event/interrupt distribution unit 180 may be an integrated part of the RTCS or may be entirely omitted if certain functionality provided by this unit is not required. The event logic unit 154 may generate a plurality of signals as will be explained in more details below which can be processed and distributed by the external event/interrupt distribution unit 180. Event Logic unit 154 may, for example, generate interrupts or control signals fed to the CPU or a peripheral 120 directly. However, according to other embodiments, event/interrupt distribution unit 180 may be coupled to an interrupt unit 190 which generates interrupt signals and/or vectors fed to CPU 110. Interrupt unit 190 may comprise an arbiter and a masking unit as common in microcontroller systems. Furthermore Event/Interrupt distribution unit 180 may also be directly connected to a system power management unit 175, system clock management unit, and/or to one or more peripheral units 120. The system power management unit 175 may control the power distribution of the various system components on the chip which can be advantageous in a battery operated system as conceptually shown in FIG. 1 with battery 50. Thus, the system power management unit 175 may generate enable signals for the different components of system 100 or selectively power such components. According to other embodiments, the system power management unit 175 may be coupled with all components via a dedicated power bus. The system power management unit 175 may be controlled via dedicated control lines or via associated special function registers. For example, according to one embodiment, the system power management unit 175 may be coupled with the event/interrupt distribution unit to supply power to selected system components, for example an analog-to-digital converter unit for a predefined time period. The analog-to-digital converter unit may be programmable to convert an analog value and generate an interrupt if the value exceeds a predefined threshold. Upon receipt of the interrupt, the CPU 110 and/or other system components may be woken up and the CPU 110 can then further process the respective data. Such an implementation can be very useful for capacitive touch recognition or other applications with a minimum of power consumption as will be explained in more detail below.

The programmable RTCS may furthermore be programmable via the special function registers 160 which can be contained in a memory-mapped special function register block. Alternatively or in addition the CPU 110 may be directly coupled to the RTCS 150. A variety of clock signals can be provided to the RTSC 150 via internal clock signal lines from clock unit 170 or via external clock sources connected through one or more pins 140. If multiple clock signals are provided, RTSC 150 may comprise a programmable clock selection unit 152. However, such a clock selection unit 152 as well as other components of the RTCS 150 can be provided externally from the RTCS 150.

Figure 2:
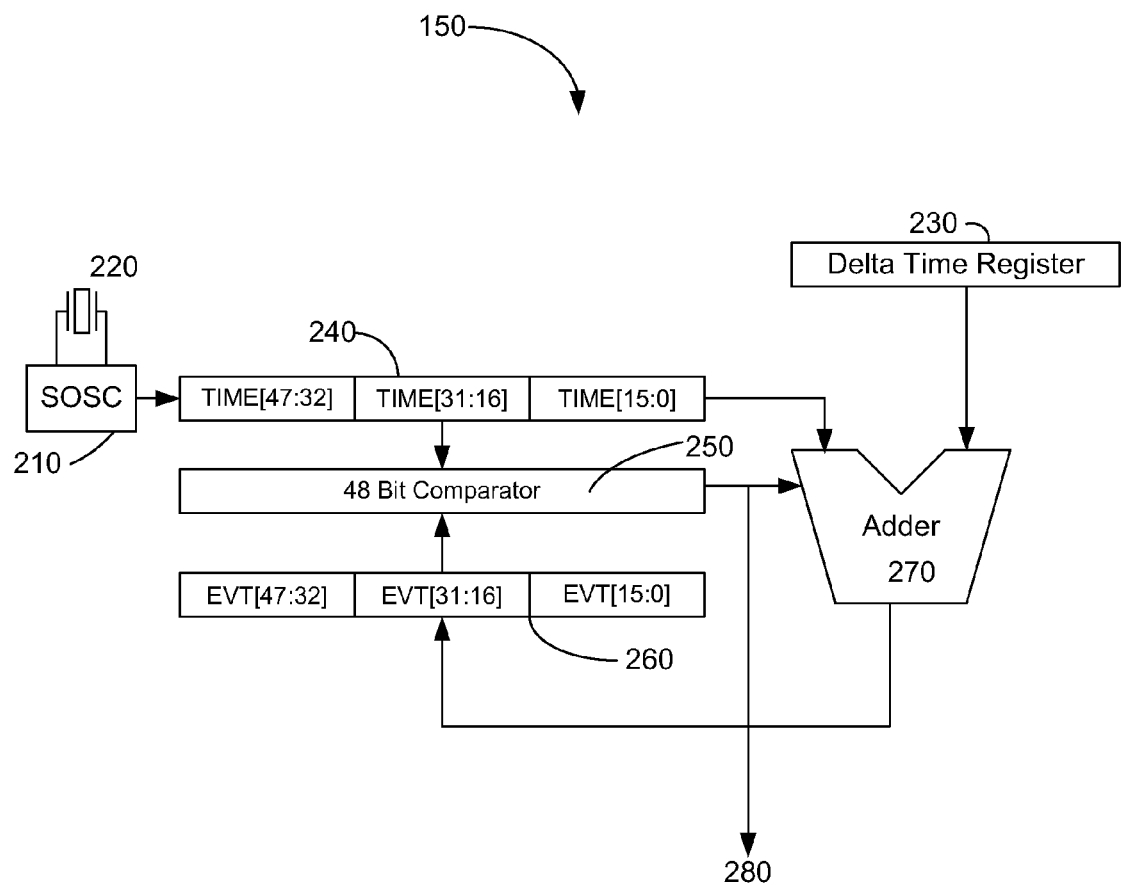
FIG. 2 shows an embodiment of a Real Time Clock & Scheduler Unit.

FIG. 2 shows a block diagram of the general concept according to an embodiment. The unit 150 shown in FIG. 2 is configured such that it can be programmed and used as a low power interrupt management unit. The purpose of this unit 150 is to maximize the time that the MCU spends in Sleep mode. The unit 150 acts like a hardware RTOS to schedule triggers or CPU wakeup events at the proper time as will be explained in more detail below.

The central element of unit 150 is a 48 bit comparator 250 coupled with a 48 bit timer register 240 and a 48 bit event register 260. However, according to other embodiments, more or less bits may be provided for comparator 250, and registers 240, 260. Timer and event registers 240, 260 may each be split into three segmented 16 bit registers as shown in FIG. 2 which may be beneficial in a 16-bit system. However, other segmentation may be used according to the bit-size of the respective MCU. Timer register 240 is clocked by a dedicated clock source which as shown in FIG. 2 may be a Sleep mode Oscillator 210 coupled with an associated crystal, for example a 32.768 KHz crystal. However, other oscillators may be used as will be explained below with respect to other embodiments. Comparator 250 constantly compares the values in registers 240 and 260 and generates a signal if the value in event register 260 is equal or exceeds the value in timer register 240. This signal is used to trigger an output signal which may be used to generate an interrupt signal. The interrupt signal can be a prioritized interrupt or an interrupt vector or a combination of both as known in the art. Furthermore, an arithmetic logic unit (ALU) 270 is provided which can also be triggered by the output signal of comparator 250. The ALU 270 can be controlled directly by comparator 250 as shown in FIG. 2. However, it may be more practical to control the ALU 270 through a general event queue control or management unit which receives the output signal from comparator 250, such as, for example, event logic unit 154 shown in FIG. 1 or event logic unit or state machine 380 as shown FIG. 3 and explained in more detail below. According to one embodiment, the ALU 270 can be an adder as shown in FIG. 2. However, other arithmetic logic units may be used. This adder 270 receives the value stored in timer register 240 at the time of the output signal generation by the comparator 250. However, according to an alternative embodiment, due to the fact that the contents of timer register 240 and event register 260 are identical at the time when comparator 250 generates the output signal, event register 260 may be coupled with the first input of adder 270. This connection may also be beneficial in case timer register 240 already advanced before ALU 270 processed the output value. The second input of adder 270 receives a value stored in a Delta Time Register 230. This register 230 can be a special function register which may be memory mapped. According to another embodiment, a plurality of delta time registers 230 may be provided. The result of the adding performed by adder 270 is fed back to the event register 260 which now automatically contains the next event. The value stored in delta time register 230 may be dynamically altered according to internal signals or states as will be explained in more detail below. Timer register 240 and/or event register 260 may also be special function registers which are memory-mapped. Alternatively, CPU 110 may have direct access to any of these registers for programming a single event.

Thus, unit 150 as shown in FIG. 2 is operable to generate one-time or periodic software events automatically. Unlike a general purpose timer, this peripheral is optimized for tracking long periods of time. The low power interrupt management unit 150 is typically clocked from a low power source such as a watch crystal 220 or a low frequency RC oscillator so that it can operate independently in Sleep Mode.

According to an embodiment, unit 150 can be configured to use the Unix Time Format. The Unix time format tracks the number of seconds that have elapsed since midnight UTC on Jan. 1, 1970. The number of seconds is stored in a 32-bit integer value, allowing the time and date to be uniquely tracked until the year 2038. A 48 bit register is required to track Unix time when the module is operated from a 32.768 KHz crystal clock. When using a 32.768 KHz clock reference, the least significant 15-bit register will allow time increments smaller than 1 second to be tracked.

The Delta Time Register 230 can be implemented with less than 48 bits, if desired, to reduce logic size. The trigger output 280 of the module can be used for these functions:

Trigger or power another peripheral—Peripheral events can be chainable so that a sequence of events can be initiated before waking the device
Generate a CPU interrupt
Generate a CPU wakeup event
Schedule Multiple Periodic Time Events In some applications it may be desirable to have multiple event loops. For example, the application may wake-up and check the ADC every 4 msec and check the user input buttons every 50 msec. As will be explained below in more detail the module can be configured to have the capability to process a list of different periods or delta times. For example, in one embodiment, the module can process a list and properly calculate absolute times that will generate an event. These events can have separate interrupt vectors so that the event type can be quickly distinguished by the CPU 110.

For scheduling an Absolute Time Event, if only one trigger event is desired, the Delta Time Register 230 may be written to 0. The user can then directly manipulate the event register bits EVT[47:0] to schedule the exact trigger time. If a time offset is written to the Delta Time register, then the event will become periodic.

Figure 3:
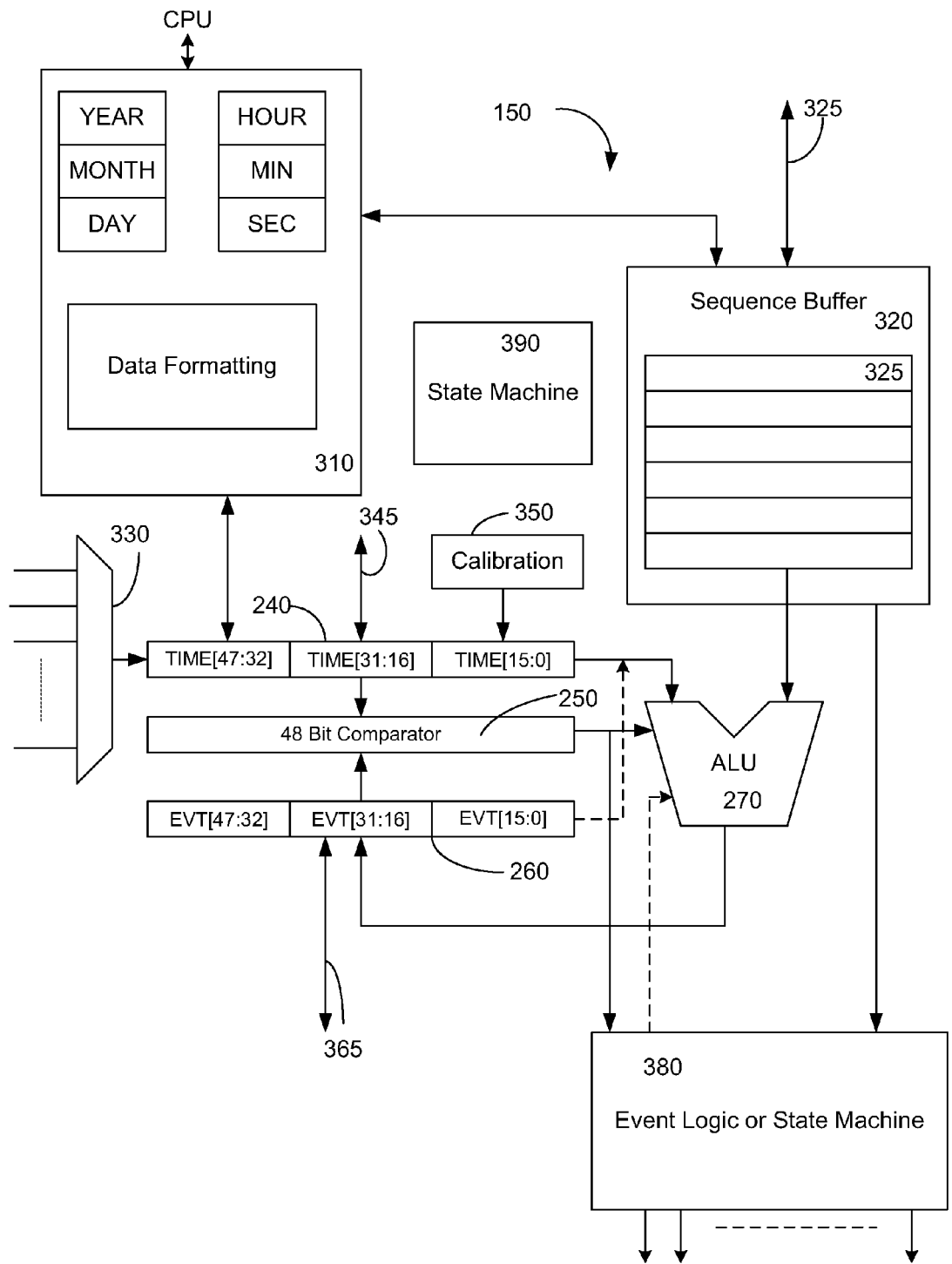
FIG. 3 shows a more detailed further embodiment of a Real Time Clock & Scheduler Unit.

According to various application examples, the unit can operate as a general purpose scheduler for
A high frequency task every 1 msec:
Sample an ADC
Load communications buffer
Do medium frequency task every 100 msec:
Check for button keypress or user activity
Blink an LED
Update display
Do low frequency task every 10 seconds:
Check battery voltage level
and/or as a low power scheduler for
Turn on an ADC, CTMU, or external peripheral enable
Wait for a stabilization period
Trigger measurement
If the measurement is within a window, wake CPU FIG. 3 shows a more detailed embodiment of an enhanced RTCS unit 150 with may have further functionality as stated above. Any combination of these additional units may be provided within an RTCS 150. The unit may in addition comprise a data formatting unit 310 coupled with the timer register 240 and a sequence buffer unit 320. Sequence buffer unit 320 may comprise a plurality of registers 325. Furthermore, a calibration unit 350 is provided to overwrite the content of the lowest 16 bits in timer register 240. However, according to other embodiments, more or less bits may be overwritten by calibration unit 350. This unit can be an offset register that is triggered to overwrite the timer register 240 at specified time intervals or manually by a user instruction.

A multiplexer 330 is provided as a clock selection unit and may receive one or more external clock signals from pins 140 and/or internal clock signals. Certain internal clock signals may use an external component as shown in FIG. 2.

Furthermore, an event logic unit 380 is provided which is coupled with the output of comparator 250 and also with an output of sequence buffer 320. In addition ALU 270 may be controlled by the event logic unit 380 instead of by comparator 250 as indicated by the dotted line. Furthermore, instead or in addition, a state machine 390 may be implemented to generate more complex signal sequences, for example, using the multiple registers 325 and/or control the operation of sequence buffer 320. State machine 390 can be coupled with any component shown in FIG. 3 as will be understood by a person skilled in the art. Thus, state machine 390 could also replace event logic unit 380 or event logic unit 380 could be realized as a state machine and receive the output signal of comparator 250 and/or sequence buffer 320 and control the output signals and ALU 270 and/or control operation of sequence buffer 320 as will be explained in more detail below.

Again FIG. 3 shows that the core of the RTCS 150 is timer register 240 (TIME) that again has for example, at least 48 bits. This allows the timer to keep Unix time format with at least 1 sec resolution and also measure shorter time intervals. The timer 240 can be clocked by any clock signal, preferably an independent clock source that can run during Sleep Mode.

For applications that need accurate timekeeping functions, again this source is typically a 32.768 KHz watch crystal oscillator as shown in FIG. 2. The calibration circuit 350 is attached to the timer 240 that provides periodic adjustments to correct for clock frequency errors. The digital comparator 250 compares the timer value with an event time that is stored in the EVT register 260.

According to an embodiment, multiple data registers 325 are provided to create the sequence buffer 320. The sequence buffer may hold a list of event times. The event times may be entered into the buffer 320 as absolute times or relative time offsets, depending on how the user configures the RTCS 150. The data in the sequence buffer 320 does not need to be the same size as the TIME register 240. The system may be configured to convert the content of registers 325, for example using the data formatting unit 310. For example, data formatting unit 310 may be used to convert absolute into relative time values.

Sequence buffer 320 may be configured and/or controlled to output register values to ALU 270 as a circular buffer wherein each time a buffer value is output, RTCS 150 may calculate a new value for that register which then will be set at the end of the circular buffer. The state machine 390 could be used to accomplish such a behavior. In addition, the circular buffer can be configured or may be controlled, for example by a state machine or through configuration registers, to operate such that a selected register 325 is always used for providing the output value. Thus, constant timer periods can be created. In addition, the sequence buffer can be configured to output the values in registers 325 in sequential order, either, continuously as a circular buffer, or for a single time, or for a predetermined time according to respective configuration register settings. Thus, sequence buffer 320 can provide for flexible and programmable operation of the RTCS 150.

ALU circuit 270 is used to add the data in the Sequence Buffer 320 to the present time stored in the TIME registers 240. The result from the ALU circuit 270 is loaded into the EVT register 260 for comparison against the TIME register 240. The Event Logic block 380 receives the match signal from the comparison of the TIME and EVT registers 240, 260. The Event Logic block 380 also receives, for example, the present position from the Sequence Buffer 325 so that the proper event signal can be asserted. The user can program the type of event signal that is to be generated by the Event Logic 380, for example through associated special function registers. For example, the Event Logic can generate pulses of different lengths depending on the type of event. The length may be predefined according to the time required to process the event by either a peripheral 120 or the CPU 110. In addition or alternatively, an output signal may be used to control another timer or clock control unit to enable a predetermined clock unit or timer. Configuration registers may be used to define which timer or clock unit may be enabled. A user can then preset the functionality of such a clock unit or timer to output predetermined clock signals. Such clock signals could further be modulated or controlled according to other signals.

According to an embodiment, circuitry 180 outside of the RTCS 150 can for example decide how each event signal will be utilized. According to further embodiments, the RTCS unit 150 may have data formatting logic 310 as mentioned above to convert Unix time into calendar time. This formatting logic 310 also may have an interface to the MCU bus so that the times can be read or modified according to various embodiments.

Unit 150 can, for example, be configured to perform the following functions:

Keep date/time in YY/MM/DD/HH/MM/SS or Unix time formats

Correct time errors due to inaccuracy of the crystal frequency

Schedule an absolute time event (e.g., interrupt the CPU 110 at 23:05:59)

Schedule an offset time event (e.g., interrupt CPU 110 ten minutes from now)

Schedule a periodic time event (e.g., interrupt the CPU 110 every ten minutes)

Act as a trigger source for other time-bases and peripherals

Sequence power to internal and/or external peripherals

Initiate a specific sequence of actions or events that may or may not wake the CPU 110 from Sleep Mode Provide unique interrupt vectors for each event.

Figure 4:
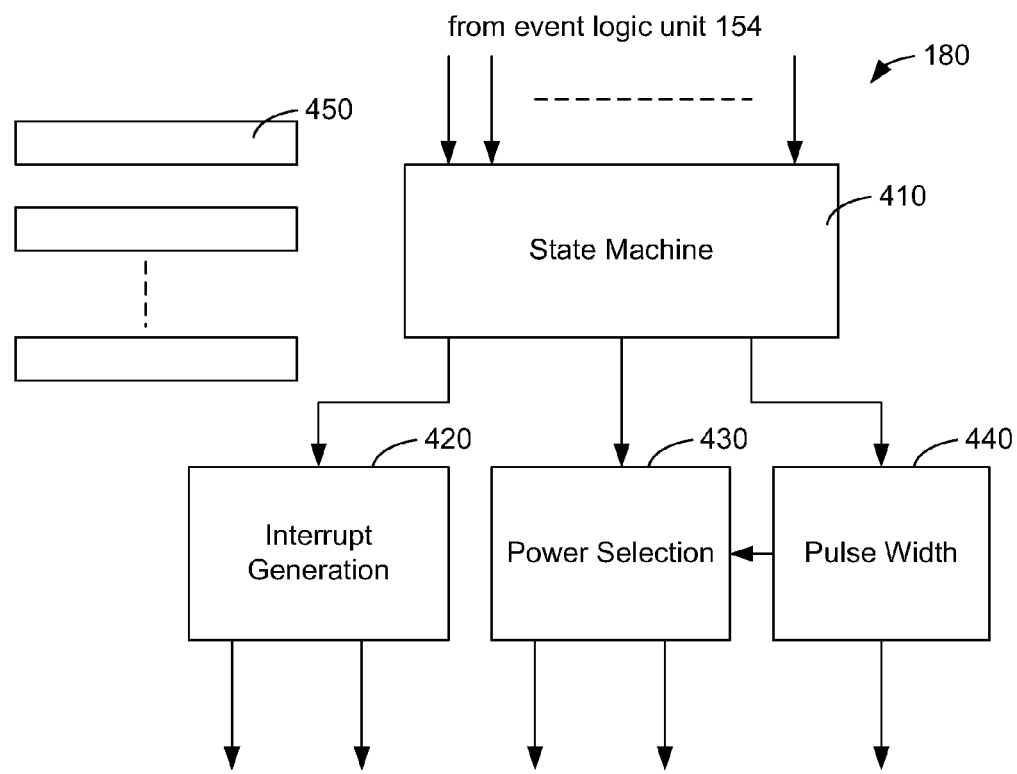
FIG. 4 shows an embodiment of an Event/Interrupt Distribution Unit.

FIG. 4 shows an example for Event/Interrupt Distribution unit 180 in more detail to explain its various functions. The unit may have a plurality of special function registers 450 to allow a user to define what functions should be performed when a specific type of event is received from the RTSC 150. To this end, for example, a simple state machine 410 may be provided which receives the multiple signals from event logic unit 154. An interrupt signal generation unit 420, a power selection unit 430 and a pulse width generation unit 440 may be provided. Output signals can also be used to control a clock unit or timer as explained above. Any combination of these units may be provided according to the respective embodiment. Thus, certain embodiments may not need one of these units or may need multiple of these units. Interrupt signal generation unit 420 is provided to generate an interrupt signal for CPU 110. Such a signal may go directly to the CPU 110 or through an interrupt controller 190. The unit may be configured to generate an interrupt with a priority or an interrupt vector. Priority or vector may depend on the event and thus this unit may use configuration registers 450 to generate the respective signals.

Power Selection unit 430 may in addition provide power to selected units according to an event. Thus, an event can be configured to not only generate an interrupt signal but in addition selective power enable signals that power up certain predefined peripheral units or components of the system including external periphery. The respective signal could also be generated without the interrupt signal. To this end, pulse width generation unit 440 is provided to generate pulses of a certain length. This unit may send these pulses directly to a peripheral to enable them for the pulse length time or for other functionality. However, the signal can also be used to control the power selection unit 430 to directly provide power to respective system components. Thus, a DMA controller could be activated for a predefined length of time to transmit data according to a predefined transfer program. In another embodiment, an ADC unit can perform analog to digital conversion of a sensor signal for the pulse width time and cause an interrupt or wake-up signal for CPU 110 if a certain predefined threshold value has been exceeded. In an alternative embodiment, pulse width unit 440 can also be part of RTCS unit 150, for example in event logic unit 154. Also as mentioned above the entire unit 180 could be embedded in RTCS unit 150. As stated above a single or multiple state machines as shown in the various embodiments of FIGS. 1, 3 and 4 can be used to provide the above functionalities.

The invention, therefore, is well adapted to carry out the objects and attain the ends and advantages mentioned, as well as others inherent therein. While the invention has been depicted, described, and is defined by reference to particular preferred embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A microcontroller comprising:
a central processing unit (CPU);
a plurality of peripherals; and
a programmable scheduler unit comprising:
a timer being clocked by an independent clock signal;
a comparator coupled with a timer register of said timer and having an output generating an output signal;
an event register coupled with said comparator;
a plurality of delta time registers arranged as a sequence buffer;
an arithmetic logic unit controlled by the output signal of the comparator and comprising first and second inputs and an output, wherein the first input is coupled with the timer register or the event register and the second input is coupled with the delta time register and the output is coupled with the event register; and
an event logic unit receiving the output signal of the comparator and an output signal of said sequence buffer indicating a sequence position and controlling said arithmetic logic unit and event register and said sequence position is taken into consideration to process an event wherein said event logic unit is configured to generate a plurality of output signals.

2. The microcontroller according to claim 1, wherein when said comparator detects a match of said event register and said timer register, the arithmetic logic is controlled to perform an arithmetic function of data received at the first and second inputs and store a resulting value in said event register.

3. The microcontroller according to claim 1, wherein the sequence buffer is a circular sequence buffer which can be controlled to output contents of said delta time registers in a circular manner, in a single sequence, or a predetermined number of times.

4. The microcontroller according to claim 1, further comprising a data formatting unit coupled with at least one of said timer register and said delta time register, wherein said data formatting unit is operable to convert an absolute time value into a relative time value.

5. The microcontroller according to claim 1, further comprising a calibration unit coupled with a predefined number of bits of said timer register and operable to overwrite said predefined number of bits in said timer register.

6. The microcontroller according to claim 5, wherein said calibration unit overwrites said timer register bits periodically.

7. The microcontroller according to claim 1, wherein said clock select unit is operable to select between a plurality of clock signals generated by at least one peripheral timer unit.

8. The microcontroller according to claim 1, further comprising a clock select unit which is operable to select between internal and an external clock signals.

9. The microcontroller according to claim 1, wherein an output signal from said event logic unit is an interrupt signal.

10. The microcontroller according to claim 1, wherein an output signal from said event logic unit is a pulse signal having a predefined pulse width.

11. The microcontroller according to claim 1, wherein an output signal from said event logic unit is fed to a clock control unit to enable a predetermined clock source.

12. The microcontroller according to claim 1, further comprising an event distribution unit receiving said plurality of output signals from said event logic unit and generating output signals which are fed to at least one of said CPU and at least one peripheral device.

13. The microcontroller according to claim 12, further comprising a system power control unit coupled with said event distribution unit.

14. The microcontroller according to claim 1, wherein said microcontroller is battery operated.

15. The microcontroller according to claim 1, comprising a plurality of special function registers for programming said programmable scheduler unit.

16. The microcontroller according to claim 1, wherein the timer register and the event register are configured to store a UNIX time format.

17. The microcontroller according to claim 1, wherein the arithmetic logic unit is an adder.

18. A method of operating a microcontroller comprising a central processing unit (CPU),
a plurality of peripherals; and
a programmable scheduler unit;
the method comprising:
programming a time value into timer register of a timer;
programming a plurality of predefined delta time values within a sequence buffer;
wherein if said event register matches said timer register, the scheduler unit automatically generates an event and adding the time value or a new time value to said event register,
further comprising processing said event to generate a plurality of output signals, wherein to process said event a sequence position of said sequence buffer is taken into consideration.

19. The method according to claim 18, wherein the step of programming the time value is performed by receiving a relative time or an absolute time and formatting said time to form said time value.

20. The method according to claim 18, wherein a matched event wakes the CPU from a Sleep mode.

21. The method according to claim 18, wherein a matched event wakes a peripheral from a Sleep mode for a predetermined time while the CPU remains in a Sleep mode.

22. The method according to claim 21, wherein during the predetermined time, the peripheral generates a signal to wake said CPU.

23. The method according to claim 18, wherein the sequence buffer is a circular sequence buffer.

24. The method according to claim 18, wherein the sequence buffer is operable to be controlled t output the time values in a circular manner, in a single sequence, or predetermined number of times.

25. The method according to claim 18, further the timer and event registers store a value in UNIX time format.

26. The method according to claim 18, further comprising periodically calibrating said timer register by means of a calibration unit.

27. The method according to claim 18, wherein docking said timer register is selected between internal and an external clock signals.

28. The method according to claim 18, wherein an output signal from said plurality of output signals is an interrupt signal.

29. The method according to claim 18, wherein an output signal from said plurality of output signals is a pulse signal having a predefined pulse width plurality of output signals is fed to a system power control unit.

30. The method according to claim 27, wherein generating said event comprises distributing a plurality of output signals to at least one of: said CPU and at least one peripheral device.

31. The method according to claim 30, wherein at least one signal of said plurality of output signals is fed to a system power control unit.

32. The method according to claim 30, wherein at least one signal of said plurality of output signals is fed to a clock control unit to enable a predetermined clock source.

* * * * *

UNITED STATES PATENT AND TRADEMARK OFFICE
CERTIFICATE OF CORRECTION

PATENT NO. : 8,984,323 B2  Page 1 of 1
APPLICATION NO. : 13/247489
DATED : March 17, 2015
INVENTOR(S) : Stephen Bowling et al.

It is certified that error appears in the above-identified patent and that said Letters Patent is hereby corrected as shown below:

In the Claims

Column 11,
Claim 24, line 15, "…sequence buffer is operable to be controlled t output the time…" ---Change to--- "…sequence buffer is operable to be controlled to output the time…"

Column 12,
Claim 27, line 1, "…The method according to claim 18, wherein docking…" ---Change to--- "…The method according to claim 18, wherein clocking…"

Signed and Sealed this
Thirtieth Day of June, 2015

Michelle K. Lee
*Director of the United States Patent and Trademark Office*